Oct. 17, 1961     E. O. SCHWEITZER, JR     3,005,134
ELECTRIC CIRCUIT MEANS
Filed Jan. 10, 1958
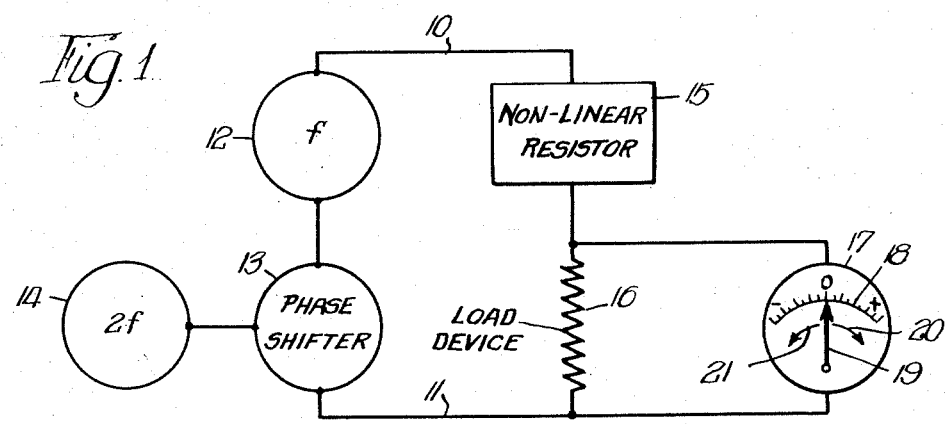
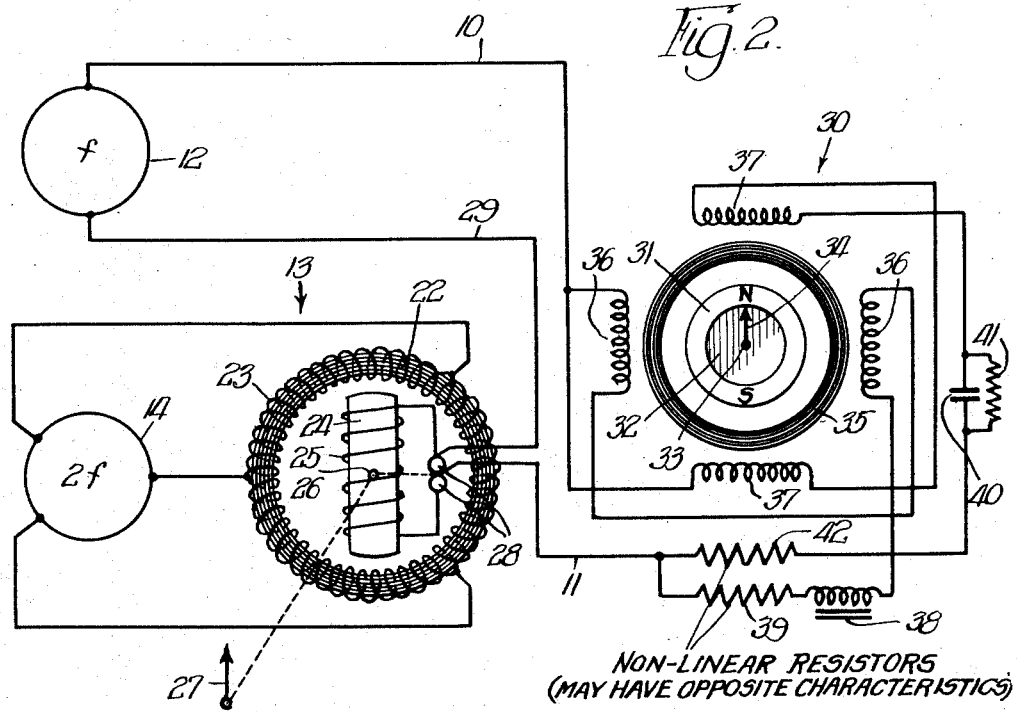
INVENTOR.
Edmund O. Schweitzer, Jr.,
BY Robert R. Lockwood
ATTY

United States Patent Office 3,005,134
Patented Oct. 17, 1961

3,005,134
ELECTRIC CIRCUIT MEANS
Edmund O. Schweitzer, Jr., 1001 Dundee Road,
Northbrook, Ill.
Filed Jan. 10, 1958, Ser. No. 708,187
8 Claims. (Cl. 318—23)

This invention relates, generally, to alternating current circuits and it has particular relation to multifrequency circuits. It relates to my copending application Serial No. 594,322, filed June 27, 1956.

Among the objects of this invention are: To connect a direct current load device through a non-linear resistor to a circuit energized with alternating current comprising a fundamental and a second harmonic; to shift the phase of one of the alternating currents with respect to that of the other in order to vary the direction and extent of flow of the direct current to the load device; to apply the alternating currents to a motor having a permanent magnet rotor or equivalent and to position the rotor in accordance with the phase relation between the fundamental and the second harmonic; to vary the phase relation in order to shift the rotor from one position to another; to provide two winding circuits through the motor at right angles to each other with a non-linear resistor in each circuit; to shift the phase angle of one winding circuit with respect to that of the other winding circuit; to effect the phase angle shift by providing inductive means in one winding circuit and capacitive means in the other winding circuit; and to employ non-linear resistors having opposite characteristics for the two winding circuits.

Other objects of this invention will, in part, be obvious, and in part appear hereinafter.

This invention is disclosed in the embodiments thereof shown in the accompanying drawing and it comprises the features of construction, combination of elements and arrangement of parts that will be exemplified in the constructions hereinafter set forth and the scope of the application of which will be indicated in the appended claims.

For a more complete understanding of the nature and scope of this invention reference can be had to the following detailed description, taken together with the accompanying drawing, in which:

FIGURE 1 illustrates diagrammatically one embodiment of this invention; and

FIGURE 2 illustrates diagrammatically a more specific application of the present invention employing a motor as the load device.

Referring now particularly to FIGURE 1 of the drawing, it will be observed that the reference characters 10 and 11 designate conductors which comprise a load circuit that is arranged to be energized with alternating current which includes a fundamental and a second harmonic. For this purpose a source 12 of frequency $f$, such as 60 cycles per second, is connected through a phase shifter 13, which is energized from a source 14 having a frequency of $2f$ or double that of the source 12, across the load circuit comprising the conductors 10 and 11. It will be understood that the frequencies referred to are for illustrative purposes and that higher or lower frequencies can be employed, the important factor however is that the frequency of one source, i.e., the source 14, is double that of the other source, i.e., the source 12. While the source 12 and phase shifter 13 are illustrated as being connected in series circuit relation, it will be understood that they can be connected in parallel. Further, it will be understood that they can be connected inductively rather than directly to the load circuit comprising the conductors 10 and 11.

Across the load circuit comprising the conductors 10 and 11 there are connected a non-linear resistor 15 and a load device 16 in series circuit relation therewith. The non-linear resistor 15 has no rectifying characteristics and it can comprise a space discharge type of device such as a neon tube. Also it may comprise a germanium diode or a tungsten filament lamp. It has been found desirable to employ for the non-linear resistor 15 a resistor of silicon carbide the conductivity of which increases with increase in current through or voltage across it. The load device 16 can be any device which requires for its operation the flow of direct current.

With a view to demonstrating the operating characteristics of the circuits as shown in FIGURE 1 arranged as described hereinbefore, a volt meter 17 can be connected across the load device 16. The volt meter 17 has a zero center scale 18 with respect to which a pointer 19 is moved. When the frequencies of the sources 12 and 14 are in phase with each other, then the pointer 19 swings in the direction indicated by the arrow 20 to the maximum positive position. The pointer 19 remains at the zero position when the double frequency $2f$ of the source 14 is either 90° or 270° out of phase with the frequency $f$ of the source 12. When the frequency $2f$ of the source 14 is 180° out of phase with the frequency $f$ of the source 12, the pointer 19 swings in the direction indicated by the arrow 21 to the maximum negative position. It will be understood that the various positions of the phase of the frequency $2f$ from the source 14 is obtained by operating the phase shifter 13 in a manner to be described in more detail hereinafter.

The foregoing operating characteristics will be more clearly understood when it is recalled that an electromotive force having an even harmonic is unsymmetrical with respect to the zero axis. The amount of unsymmetry is proportional to the cosine of the angle between the fundamental frequency $f$ and the even harmonic $2f$. It follows that the unsymmetry is a maximum at 0° and 180° and a minimum at 90° and 270°. When such an unsymmetrical electromotive force is applied to a conductor whose resistance changes with applied voltage, i.e., the non-linear resistor 15, a net unidirectional flow of current in the direction of greater peak voltage results. The magnitude of direct current is proportional to the cosine of the angle between the fundamental $f$ and the second harmonic $2f$ and the polarity changes as the sign of the cosine changes from positive to negative.

Referring now particularly to FIGURE 2 of the drawing, it will be observed that the source 12 of frequency $f$ is employed together with the phase shifter 13 and the source 14 of the frequency $2f$. Here the source 14 is illustrated as being a three phase source and the combination is arranged as illustrated in FIGURE 1 to energize the load circuit comprising the conductors 10 and 11 with alternating current which is composed of a fundamental and a second harmonic.

Since it is desired that a certain amount of power be drawn from the sources 12 and 14, a phase shifter 13 is employed which permits this with out distortion resulting from the use of power for operating a device.

Under these circumstances the phase shifter 13 can comprise a stator core 22 around which there is a stator winding 23 that is closed on itself and is tapped at locations 120° apart for connection to the terminals of the three phase source 14, as shown. Mounted for rotation within the stator core 22 and stator winding 23 is a rotor 24 which is provided with a rotor winding 25, the rotor 24 being mounted for rotation on a shaft 26 which is indicated as carrying a pointer 27 the position of which corresponds to the position of the rotor 24. Slip rings 28 are provided for making connection to the rotor winding 25 in conventional manner. As shown in the drawing the rotor winding 25 in which the frequency $2f$ is induced is in series with the frequency $f$ from the source 12. The phase relationship between the frequency of the source 12 and the frequency from the source 14 can be adjusted by changing the position of the rotor 24 which is indicated by the pointer 27. This can be done manually or it can be accomplished through the agency of a motor, such as a synchronous motor, which would drive the rotor 24 at a predetermined speed.

The output of the source 12 generating a fundamental frequency and the output of the source 14 generating a double frequency or second harmonic of the frequency generated by the source 12, controlled by the phase shifter 13, can be employed for controlling the operation of a motor that is indicated, generally, at 30.

The motor 30 includes a rotor in the form of annular core 31 of of permanent magnet material which is magnetized, as indicated, along a diameter. It is preferable to employ the annular form for the core 31 although it will be understood that a bar type of rotor could be employed. Also an electro magnet rather than a permanent magnet can be employed for the rotor of the motor 30. The annular core 31 is mounted on a circular hub 32 which in turn is mounted on a shaft 33 which carries a pointer 34. In accordance with this invention the pointer 34 rotates synchronously with the pointer 27. If the phase shifter 13 were employed for shifting the phase of the frequency $f$ with respect to the phase of the frequency $2f$, the pointer 34 would rotate through 360° for each 180° rotation of the pointer 27.

Surrounding the annular core 31 is a core 35, annular in form and made of transformer steel. It may be made up of a single strip of transformer steel spirally wound to provide the annular core shown. Pairs of windings 36—36 and 37—37 are provided on the core 35. For illustrative purposes they are shown in spaced relation to the core 35. It will be understood that each of these windings is in the form of a coil around the core 35 and they are connected, as shown, so that, on flow of direct current therethrough they generate magnetic fields at right angles to the diameters through the respective pairs of windings 36—36 and 37—37. If desired, a damping ring can be provided between the annular core 31 of the rotor and the annular core 35 of the stator.

It is desirable that the phase angle of the two circuits including the pairs of windings 36—36 and 37—37 be different. For this purpose an inductor 38 is connected in series circuit relation with the winding circuit comprising the windings 36—36. Included in this circuit is a non-linear resistor 39 of the type previously described. For illustrative purposes it is pointed out that it may be formed of silicon carbide.

The other winding circuit comprising the windings 37—37 is connected through a capacitor 40, having in parallel therewith a resistor 41, and through a non-linear resistor 42. It will be observed that the two windings circuits are connected in parallel relation between the conductors 10 and 11 which comprise the load circuit.

The inductor 38 and capacitor 40 can be omitted when the non-linear resistors 39 and 42 have opposite characteristics. For example silicon carbide and tungsten have opposite characteristics.

When the sources 12 and 14 are operating to generate the frequencies $f$ and $2f$, respectively, the pointer 34 takes up a position corresponding to the position of the pointer 27. On rotation of the latter, the former follows it. For time keeping purposes, the shaft 26 carrying the rotor 24 can be rotated at a speed of one revolution each twelve hours and a corresponding speed of rotation of the pointer 34 will result. Thus it can be employed in conjunction with a clock dial to indicate the time of day. By providing a gear ratio of the order of one to twelve a minute hand can be operated.

Any reasonable number of motors 30 can be energized from the load circuit comprising the conductors 10 and 11. For example, all of the clocks in an office building or manufacturing plant can be energized from the load circuit comprising the conductors 10 and 11 when it is energized in the manner described hereinbefore.

In FIGURE 2, if the non-linear resistors 39 and 42 have similar characteristics, the phase angle between $f$ and $2f$ that produces maximum direct current in windings 36—36 will also produce maximum direct current in windings 37—37. In order to have the relative angular position of the permanent magnet rotor 31 the same as that of the rotor 24 of the phase shifter 13, the phase splitting inductor 38 and capacitor resistor combination 40—41 are used. The values of inductance, capacitance and resistance are chosen such that, when $f$ and $2f$ are in phase, windings 36—36 carry maximum direct current while no direct current flows through windings 37—37. Under these circumstances, when the rotor 24 of the phase shifter 13 has been turned through 90° and $f$ and $2f$ are 90° out of phase, windings 36—36 have no direct current flowing therethrough and windings 37—37 carry maximum direct current. Further rotation of the rotor 24 through an additional 90° causes $f$ and $2f$ to be 180° out of phase and windings 36—36 again carry maximum direct current but in the opposite direction. Then no direct current flows through windings 37—37, when the rotor 24 is shifted an additional 90°, $f$ and $2f$ are 270° out of phase and maximum direct current flows through windings 37—37 in a reverse direction. Essentially what happens is a change of 360° in phase between $f$ and $2f$ causes the resultant unidirectional magnetic field generated by windings 36—36 and 37—37 to rotate through 360°.

Since certain further changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. In combination, a first source of alternating current, a second source of alternating current having a frequency twice that of said first source, a load circuit connected for energization to said sources, and a non-linear resistor connected in series circuit relation with a load device and across said load circuit, said non-linear resistor being characterized by being capable of conducting current in one direction or the other whereby a direct current component flows through said load device in one direction or the other and to an extent depending upon the phase relationship between said alternating currents.

2. In combination, a first source of alternating current, a second source of alternating current having a frequency twice that of said first source, a load circuit connected for energization to said sources, means for shifting the phase of one of said alternating currents with respect to the phase of the other alternating current, and a non-linear resistor connected in series circuit relation with a load device and across said load circuit, said non-linear resistor being characterized by being capable of conducting current in one direction or the other whereby a direct current component flows through said load device in one direction or the other and to an extent depending upon the phase relationship between said alternating currents.

3. In combination, a first source of alternating current, a second source of alternating current having a frequency twice that of said first source, a load circuit connected for energization to said sources, a motor including a permanent magnet rotor and a stator having two winding means in spaced relation around said rotor, a non-linear resistor connected in series circuit relation with each winding means and each resistor and its winding means connected across said load circuit, each non-linear resistor being characterized by being capable of conducting current in one direction or the other whereby a direct current component flows through each winding means in one direction or the other and to an extent depending upon the phase relationship between said alternating currents and said rotor is moved to a position corresponding thereto.

4. In combination, a first source of alternating current, a second source of alternating current having a frequency twice that of said first source, a load circuit connected for energization to said sources, means for shifting the phase of one of said alternating currents with respect to the phase of the other alternating current, a motor including a permanent magnet rotor and a stator having two winding means in spaced relation around said rotor, a non-linear resistor connected in series circuit relation with each winding means and each resistor and its winding means connected across said load circuit, each non-linear resistor being characterized by being capable of conducting current in one direction or the other whereby a direct current component flows through each winding means in one direction or the other and to an extent depending upon the phase relationship between said alternating currents and said rotor is moved to a position corresponding thereto.

5. The invention as set forth in claim 4 wherein each winding means comprises two series connected windings on diametrically opposite sides of said stator and on energization with direct current generating a unidirectional magnetic field in a direction at right angles to the respective diameter.

6. The invention as set forth in claim 4 wherein means are provided for shifting the phase angle of the circuit including one winding means with respect to the phase angle of the circuit including the other winding means.

7. The invention as set forth in claim 4 wherein means are provided in the circuit through each winding means for shifting the phase of angle of its circuit with respect to the phase angle of the circuit of the other winding means.

8. The invention as set forth in claim 4 wherein the non-linear resistors have opposite conducting characteristics.

No references cited.